(12) United States Patent
Charleux et al.

(10) Patent No.: US 12,251,890 B2
(45) Date of Patent: Mar. 18, 2025

(54) METHOD FOR PRODUCING A PREFORM FOR PART OF A BLADE OR PROPELLER BY WINDING A WEAVE OBTAINED BY WEAVING TO SHAPE

(71) Applicants: SAFRAN AIRCRAFT ENGINES, Paris (FR); SAFRAN, Paris (FR)

(72) Inventors: François Charleux, Moissy-Cramayel (FR); Dominique Marie Christian Coupe, Moissy-Cramayel (FR)

(73) Assignees: SAFRAN AIRCRAFT ENGINES, Paris (FR); SAFRAN, Paris (FR)

(*) Notice: Subject to any disclaimer, the term of this patent is extended or adjusted under 35 U.S.C. 154(b) by 0 days.

(21) Appl. No.: 18/706,597

(22) PCT Filed: Oct. 24, 2022

(86) PCT No.: PCT/FR2022/052014
§ 371 (c)(1),
(2) Date: May 1, 2024

(87) PCT Pub. No.: WO2023/079225
PCT Pub. Date: May 11, 2023

(65) Prior Publication Data
US 2024/0326351 A1    Oct. 3, 2024

(30) Foreign Application Priority Data
Nov. 4, 2021 (FR) ........................ 2111718

(51) Int. Cl.
*B29C 70/22* (2006.01)
*B29B 11/16* (2006.01)
(Continued)

(52) U.S. Cl.
CPC ............ *B29C 70/228* (2013.01); *B29B 11/16* (2013.01); *B29C 53/564* (2013.01); *B29C 70/24* (2013.01); *B29C 70/32* (2013.01); *B29L 2031/08* (2013.01)

(58) Field of Classification Search
CPC ............................... B29C 70/24; B29C 70/32
See application file for complete search history.

(56) References Cited

U.S. PATENT DOCUMENTS

2010/0322776 A1    12/2010    Laurent
2011/0038732 A1    2/2011     Huth et al.
(Continued)

FOREIGN PATENT DOCUMENTS

CA    2832317 A1    10/2012
CN    101927568 A   12/2010
(Continued)

OTHER PUBLICATIONS

Translation of WO-2021038164-A1 (Year: 2021).*
(Continued)

*Primary Examiner* — John J DeRusso
(74) *Attorney, Agent, or Firm* — Pillsbury Winthrop Shaw Pittman LLP

(57) ABSTRACT

A method for manufacturing a fibrous preform for a blade or propeller part of a turbomachine, includes at least one fixing base extended by a mounting portion of an aerodynamic profile, the method including the winding of a fibrous texture, obtained by contour weaving, on a substrate of changing section having at least a first region of extra thickness in the shape of the fixing base and a second region in the shape of the mounting portion of the aerodynamic profile.

11 Claims, 4 Drawing Sheets

(51) Int. Cl.
    *B29C 53/56*    (2006.01)
    *B29C 70/24*    (2006.01)
    *B29C 70/32*    (2006.01)
    *B29L 31/08*    (2006.01)

(56) References Cited

U.S. PATENT DOCUMENTS

| | | |
|---|---|---|
| 2011/0311368 A1 | 12/2011 | Coupe et al. |
| 2014/0027046 A1 | 1/2014 | Mathon et al. |
| 2016/0076874 A1 | 3/2016 | Corradini et al. |
| 2016/0195063 A1 | 7/2016 | Hoffmann |
| 2017/0175308 A1* | 6/2017 | Provost .................. B29B 11/16 |
| 2019/0062962 A1* | 2/2019 | Hellot .................. D03D 41/004 |
| 2019/0160765 A1* | 5/2019 | Le Hong ............... B29C 70/462 |
| 2019/0217943 A1 | 7/2019 | Courtier |
| 2019/0263021 A1* | 8/2019 | Fabre .................... B29C 53/043 |
| 2019/0309639 A1 | 10/2019 | Fages |
| 2021/0156266 A1* | 5/2021 | Farrar .................... F01D 5/282 |

FOREIGN PATENT DOCUMENTS

| | | | |
|---|---|---|---|
| CN | 102232020 A | 11/2011 | |
| CN | 105451973 A | 3/2016 | |
| CN | 110356013 A | 10/2019 | |
| DE | 10 2016 110848 A1 | 12/2017 | |
| FR | 3 100 737 A1 | 3/2021 | |
| WO | WO 2014/174198 A1 | 10/2014 | |
| WO | WO-2021038164 A1 * | 3/2021 | ............. B29C 53/60 |
| WO | WO-2021123652 A1 * | 6/2021 | ............. B29C 70/24 |

OTHER PUBLICATIONS

Translation of WO-2021123652-A1 (Year: 2021).*
Written Opinion of the International Searching Authority as issued in International Patent Application No. PCT/FR2022/052014, dated Feb. 14, 2023.
International Search Report as issued in International Patent Application No. PCT/FR2022/052014, dated Feb. 14, 2023.
Office Action as issued in Chinese Patent Application No. 202280085201.9, dated Sep. 26, 2024.

* cited by examiner

[Fig. 1]
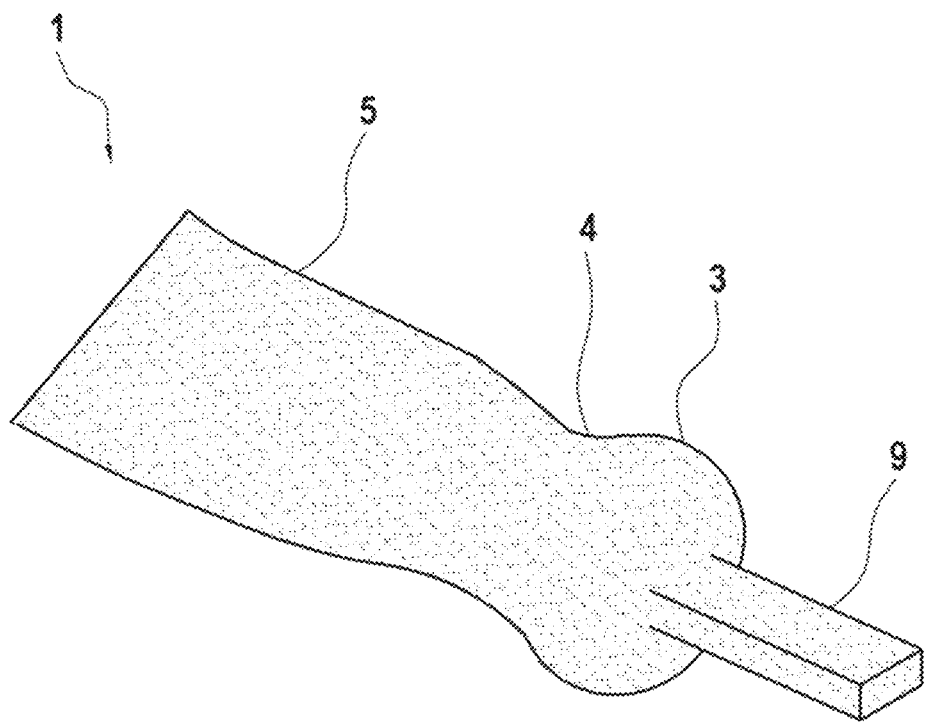
[Fig. 2]
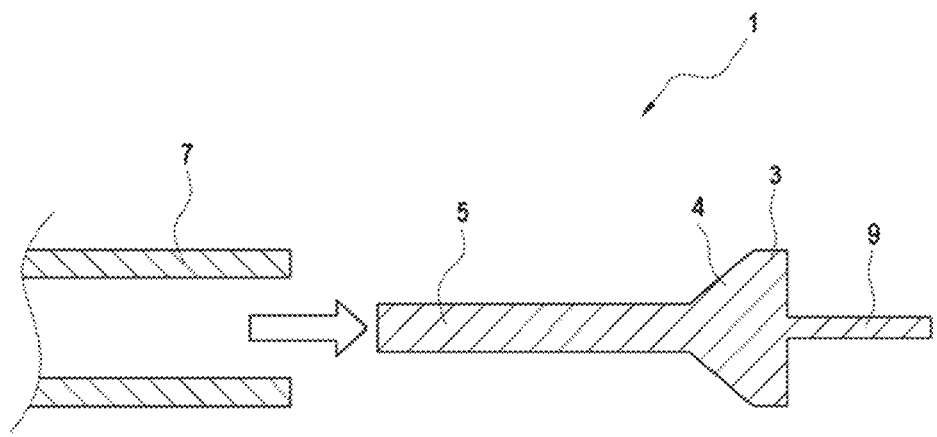

[Fig. 3]
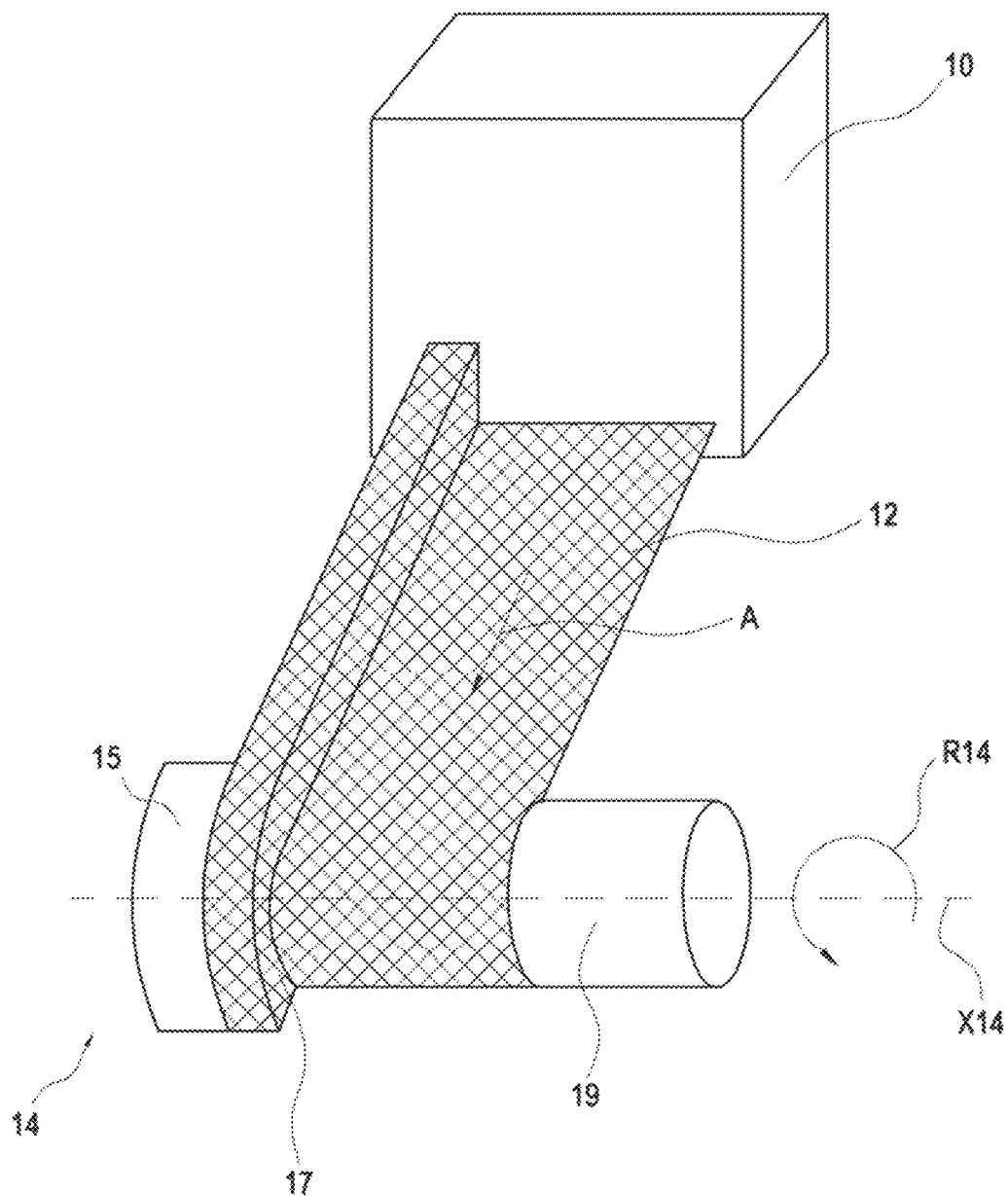

[Fig. 4]
[Fig. 5]
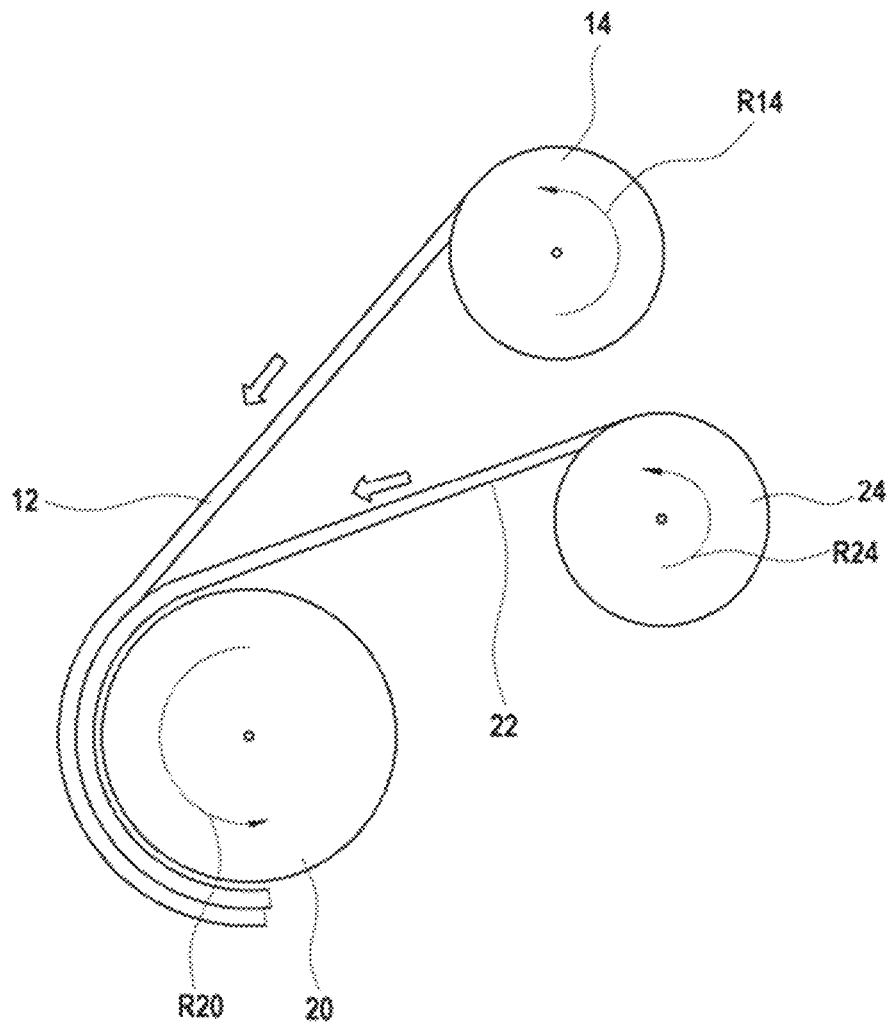

[Fig. 6]
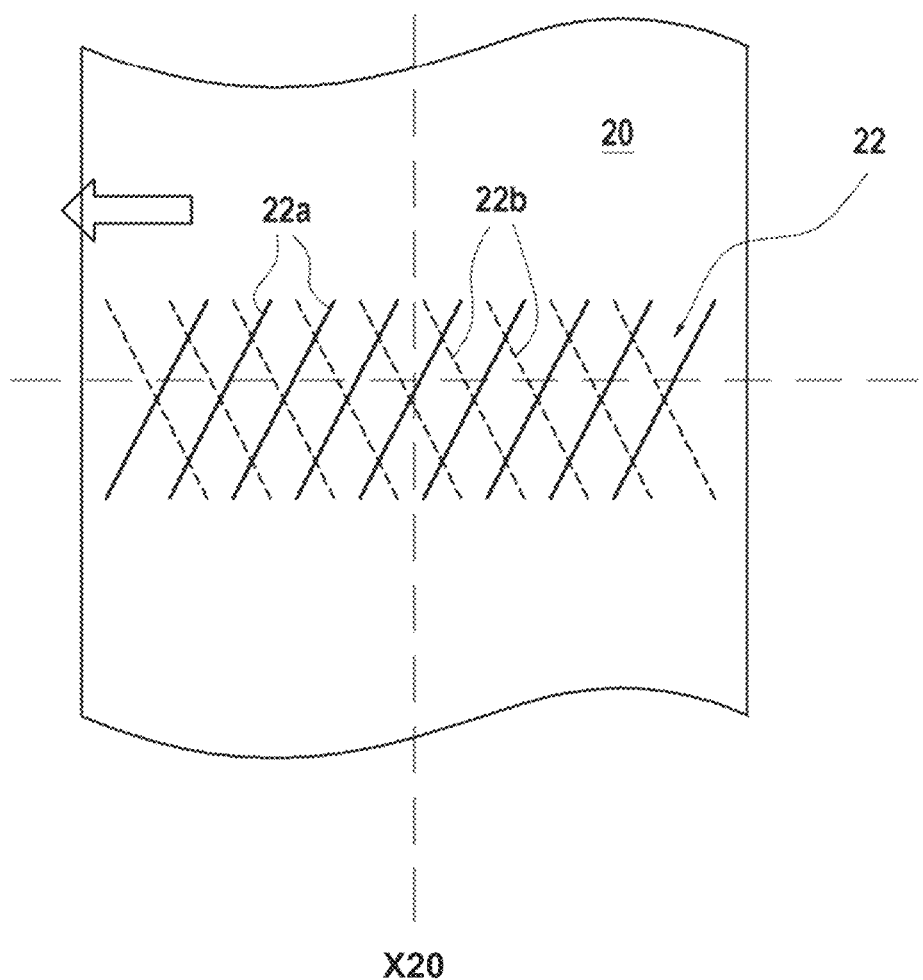

METHOD FOR PRODUCING A PREFORM FOR PART OF A BLADE OR PROPELLER BY WINDING A WEAVE OBTAINED BY WEAVING TO SHAPE

CROSS-REFERENCE TO RELATED APPLICATIONS

This application is the U.S. National Stage of PCT/FR2022/052014, filed Oct. 24, 2022, which in turn claims priority to French patent application number 21 11718 filed Nov. 4, 2021. The content of these applications are incorporated herein by reference in their entirety.

TECHNICAL FIELD

The present invention relates to the manufacture of a preform for a blade or propeller part having a changing thickness in which a contour weaving is used to form the fibrous texture which will be wound on a substrate having the shape to be obtained. The invention also relates to methods for manufacturing associated parts made of composite material.

PRIOR ART

Turboprop propeller parts having a fixing base with an extra thickness, called "bulb base" or "tulip base" extended by a spar on which an aerodynamic profile is intended to be fitted can be obtained by superimposing layers of fibrous braids around a foam mandrel. With this method, deviations can be observed compared to what is expected for the orientations of the fibers, in particular in the areas where the diameter of the piece varies, which may affect the mechanical performance. It may further be sought to increase the amount of fibers along the longitudinal axis of the propeller to be obtained. Since the braiding machine can only store a limited amount of axial fibers, it may be necessary to manually drape additional unidirectional fibrous layers during braiding, which lengthens and complicates the method. To this can be added intermediate pre-compaction operations to limit the expansion of the preform thus constructed, before it is placed in a mold for the resin injection by resin transfer molding technique. US 2011/0038732 which discloses a turbomachine blade made of composite material is known.

It is therefore desirable to have methods for manufacturing propeller parts and also blade parts for turboprop engines, which make it possible to overcome the drawbacks associated with the technique of braiding on a mandrel.

DISCLOSURE OF THE INVENTION

The invention proposes a method for manufacturing a fibrous preform for a blade or propeller part of a turbomachine, comprising at least one fixing base extended by a mounting portion of an aerodynamic profile, the method comprising at least:
  the winding of a fibrous texture, obtained by contour weaving, on a substrate of changing section having at least a first region of extra thickness in the shape of the fixing base and a second region in the shape of the mounting portion of the aerodynamic profile.

The invention proposes to make, by contour weaving technique, the texture intended to be wound to form the preform of the blade or propeller part. The contour weaving is a technique known per se for obtaining other types of pieces and implements a take-up mandrel at the exit of the loom which has a non-cylindrical shape so as to take up the texture with a local length of circumferential yarns to the take-up mandrel (corresponding to the warp yarns) adapted to allow the texture to match the shape of the substrate during the winding without being deformed.

The invention thus makes it possible to overcome the drawbacks associated with the braiding technique to make a piece part of complex shape and obtain the desired fibrous orientations even in the thickness variation areas. The invention also allows a high production rate and has a controlled implementation cost without requiring a complex machining but requiring only a possible trimming after formation of the matrix.

In one exemplary embodiment, the fibrous texture is co-wound on the substrate with a multiaxial web having fibers oriented differently from the fibers of the fibrous texture. In this case, the multiaxial web can be present on all or part of the winding of the fibrous texture as will be recalled below.

Such a characteristic advantageously makes it possible to improve the shear resistance of the obtained piece.

Particularly, the multiaxial web can comprise at least a first unidirectional fibrous layer oriented at +45° relative to a longitudinal axis of the substrate, superimposed on at least a second unidirectional fibrous layer oriented at −45° relative to the longitudinal axis of the substrate.

In one exemplary embodiment, the fixing base of the fibrous preform is axisymmetric.

In one exemplary embodiment, the texture is obtained by contour weaving by using a take-up mandrel at the exit of the loom separate from the substrate and having at least a first yarn take-up area with a first radius and a second yarn take-up area with a second radius, the first radius being greater than the second radius, the yarns taken up on the first area being wound on the first region of the substrate and those taken up on the second area being wound on the second region of the substrate.

Such a characteristic advantageously makes it possible to promote the proportion of warp yarns in the circumferential direction on the fixing base, which improves the resistance of the piece to the loads encountered in operation. However, there is no departure from the framework of the invention if, as a variant, the proportion of weft yarns is promoted. Generally, the warp/weft ratio is determined according to the areas of the piece depending on the loads.

In one exemplary embodiment, the weaving in the shape of the texture and its winding on the substrate are carried out continuously.

Such a characteristic advantageously makes it possible to further increase the production rate.

In one exemplary embodiment, the substrate is obtained by three-dimensional weaving.

In this case, the substrate forms a structural part which is intended to remain in the propeller or the blade mounted in the turbomachine in order to improve its mechanical performance.

The invention also relates to a method for manufacturing a composite material blade or propeller part for a turbomachine, comprising at least:
  the manufacture of a fibrous preform for the blade or propeller part of a turbomachine by implementing a method as described above, and
  the formation of a matrix in a porosity of the fibrous preform thus obtained.

The invention also relates to a method for manufacturing a composite material blade or propeller for a turbomachine, comprising at least:

- the formation of a fibrous preform for the blade or propeller part of a turbomachine as described above,
- the positioning of a fibrous preform of an aerodynamic profile on the mounting portion, and
- the co-densification of the fibrous preform of the turbomachine blade or propeller part and the fibrous preform of the aerodynamic profile positioned on this preform in order to obtain the turbomachine blade or propeller.

In one exemplary embodiment, a fan blade is obtained, for example a variable-pitch fan blade, but the invention is not limited to this example as will be described below.

BRIEF DESCRIPTION OF THE DRAWINGS

FIG. 1 represents, schematically and in perspective, an example of a preform for a blade or propeller part of a turbomachine that can be obtained by implementing the invention.

FIG. 2 represents, schematically, a longitudinal section of the preform of FIG. 1 with fitting of a preform of an aerodynamic profile.

FIG. 3 represents, schematically, the formation of the fibrous texture by contour weaving with a view to forming the preform of FIG. 1.

FIG. 4 represents a longitudinal section of the take-up mandrel used in FIG. 3.

FIG. 5 represents, schematically, the co-winding of the fibrous texture formed by contour weaving according to FIG. 3 with a multiaxial web.

FIG. 6 represents a detail of the multiaxial web.

DESCRIPTION OF THE EMBODIMENTS

FIG. 1 illustrates an example of a fibrous preform 1 according to the invention which is intended to form the fibrous reinforcement of part of a variable-pitch fan blade made of composite material. Such a piece is adjustable in position about its axis to optimize the flow of the air stream in the fan. The remainder of the description attempts to describe the application of the invention to this type of piece but those skilled in the art will recognize that the invention is also applicable to other types of pieces, such as ducted rotating blades in general or propellers. The blades or the propellers may or may not be variable-pitch blades or propellers. The blade or the propeller may or may not be a piece of an aeronautical turbomachine, the invention can thus apply the manufacture of wind turbine propellers.

The fibrous preform 1 comprises a fixing base 3 defining an extra thickness, also called "bulb base" or "tulip base" through which most of the forces in operation pass, which fixing base extends by a mounting portion 5 of an aerodynamic profile which is here in the shape of a flattened portion forming a spar. Once densified, the fixing base 3 is intended to be mounted on a turbomachine rotor by engagement in a housing arranged on the periphery of the rotor of corresponding shape. A preform 7 of an aerodynamic profile (airfoil part) is intended to be fitted onto the mounting portion 5 (see FIG. 2) in order to obtain the complete piece by interposing, if desired, a third element such as a foam (not represented). A transition portion 4 is present between the fixing base 3 and the mounting portion 5. The transition portion 4 has a thickness which decreases in the direction of the mounting portion 5. The fibrous preform 1 also comprises a pivoting element 9 defining an end of the preform 1 and located on the side opposite to the mounting portion 5 which is able to allow the pivoting of the blade relative to its axis in operation in order to optimize its orientation.

The preform 1 is obtained by winding of a fibrous texture on a substrate of non-expandable shape which has the shape of the preform to be obtained, with in particular a changing section between a first region of extra thickness intended to define the fixing base 3 and a second region intended to define the mounting portion 5. According to the invention, the fibrous texture is obtained by contour weaving technique so that the texture matches the shape of the substrate during the winding without being deformed.

The weaving in the shape of the texture is described in relation with FIGS. 3 and 4. According to this technique, a take-up mandrel 14 positioned directly at the exit of the loom 10 which has a non-cylindrical geometry is used to take up the warp yarns. The take-up mandrel 14 is rotatable (rotation arrow R14 about the axis of the mandrel X14) and takes up through its rotation the warp yarns along the take-up direction A. The warp yarns are woven in the loom 10 with weft yarns to obtain the fibrous texture 12. The fibrous texture 12 produced by the loom 10 conforms to the take-up mandrel 14 which has a particular shape then allowing the winding on the substrate without deformation of the texture 12. The take-up mandrel 14 has along its axis X14 a first cylindrical portion 15 defining a first yarn take-up area, a second tapered transition portion 17 and a third cylindrical portion 19 which defines a second yarn take-up area. The yarns taken up on the first area 15 will be wound on the first region of the substrate intended to form the fixing base 3 and the yarns taken up on the second area 19 will be wound on the second region of the substrate intended to form the mounting portion 5. The geometry of the take-up mandrel 14 allows not consuming the warp yarns uniformly along its axis X14. Indeed, the length of warp yarns taken up by the mandrel 14 is a function of the local radius of this mandrel. The higher the local radius of the mandrel 14, the greater the length of warp yarns taken up during a rotation of the mandrel. As illustrated in FIG. 4, the first 15 and second 19 take-up areas have different radii R1 and R2 respectively. Characteristically of the contour weaving technique, the ratio of the radii R1/R2 is substantially equal to the ratio of the perimeters P1/P2 on the substrate, where P1 designates the perimeter of the first region of the substrate and P2 designates the perimeter of the second region of the substrate. This makes it possible to guarantee that the length of the warp yarns taken up locally by the mandrel 14 corresponds to the perimeter of the region of the substrate on which these yarns will be wound so as not to deform the texture 12 during the winding. In the illustrated example, the radius R1 is greater than the radius R2 but there is no departure from the framework of the invention if a reverse configuration was implemented according to the desired geometry for the final piece. The first region of the substrate can advantageously be symmetrical about the axis of the substrate in order to form an axisymmetric fixing base 3. Other variants are possible where the first region of the substrate is not axisymmetric, for example having the shape of a polygon with rounded corners. The invention of course also concerns other geometries with more areas of different radii. The second tapered portion 17 has a profile making it possible to make the transition portion 4 between the fixing base 3 and the mounting portion 5. It will be noted that the fibrous texture 12 can be obtained by three-dimensional weaving or as a variant by two-dimensional weaving. The fibrous texture 12 can be formed of carbon, glass, or polymer yarns or of a mixture of such fibers. It will be noted that it is also possible to locally modify the nature of the yarns, the size of the yarns and the weave in order to optimize the mechanical properties of the piece. In the obtained preform 1, the warp yarns are oriented circumferentially and the weft yarns are oriented axially.

FIG. 5 illustrates a co-winding of the fibrous texture 12 obtained by contour weaving on the substrate 20. In the example of FIG. 5, the fibrous texture 12 is conveyed from the take-up mandrel 14 on the substrate 20, separate from the take-up mandrel, continuously. The substrate 20 is rotated (arrow R20) about its axis in order to take up the fibrous texture 12 from the take-up mandrel 14. The rotation of the substrate 20 also makes it possible to take a multiaxial web 22 from a rotatable mandrel 24 (arrow R24) which is separate from the take-up mandrel 14 in order to co-wind the fibrous texture 12 and the multiaxial web 22 on the substrate 20. The number of layers of yarns in the texture 12 and the number of winding turns are determined according to the desired thickness for the piece which is a function of the loads to which it is subjected in operation. A texture obtained by three-dimensional weaving makes it possible to increase the thickness of the composite while requiring few turns for obtaining the desired piece. The use of a texture obtained by two-dimensional weaving can be favored for composites of reduced thickness. In the case of the co-winding illustrated in FIG. 5, an alternation of wound layers of a fibrous texture 12 and a multiaxial web 22 will be obtained in the fibrous preform. The co-winding can be carried out on the first and second regions of the substrate 20. FIG. 6 illustrates a detail of the multiaxial web 22 which can be implemented where it comprises a first unidirectional fibrous layer comprising the fibers 22a which is superimposed on a second unidirectional fibrous layer comprising the fibers 22b. The fibers 22a and 22b each have different orientations and have different orientations relative to the orientation of the warp and weft yarns of the fibrous texture 12. The fibers 22a and 22b can be oriented at +45° and −45° relative to the longitudinal axis X20 of the substrate 20. The orientation of the fibers 22a and 22b depends on the envisaged application. It will also be noted that the invention is not limited to a co-winding with the multiaxial web 22 and that only the texture 12 can be wound on the substrate 20 in order to obtain the fibrous preform 1. It will also be noted that other textiles than a multiaxial web 22 can be co-wound with the texture 12, such as for example two-dimensional fabrics, three-dimensional fabrics or braids. Also in the case where the texture 12 is co-wound with a separate textile, said textile can be present on only part of the winding of the fibrous texture. The location of the local co-winding is determined according to the loads experienced by the piece. This situation can result from the use of a textile with a width smaller than the width of the fibrous texture. Unless otherwise stated, the width is measured transversely to a take-up direction towards the substrate. As a variant, the textile is present over the entire winding of the fibrous texture (co-winding over the entire area where the texture is wound). FIGS. 5 and 6 which have just been described illustrate how the formation of the texture 12 by contour weaving on the take-up mandrel 14 and the winding on the substrate 20 are continuously made. According to one variant not illustrated, the texture 12 can be first formed by contour weaving then stored on a storage mandrel with a view to initiating the winding on the substrate 20 subsequently, after completion of the contour weaving. In the latter case, a winding is carried out to transfer the contour texture from the storage mandrel to the substrate (with possible co-winding as described above).

The substrate 20 on which the texture 12 is wound can be of varied nature. According to one example, the substrate is intended to remain in the piece intended to be mounted in the turbomachine. In this case, the substrate 20 can be structural, for example by being formed by three-dimensional weaving. It is possible, according to one variant, to use a substrate 20 having a density smaller than the density of the piece made of composite material to be obtained, for example made of cellular material such as foam. According to one variant, the substrate 20 is not intended to remain in the piece intended to be mounted in the turbomachine. It is thus possible to use a substrate which is intended to be dismounted or eliminated after the winding and possibly after the densification of the fibrous preform 1. It is thus possible to obtain a piece having a hollow part at the level of the base and of the mounting portion of the profile, thereby lightening it if desired.

After winding on the substrate 20, the fibrous preform 1 comprising the fixing base 3 and the mounting portion 5 illustrated in FIG. 1 is obtained. The method for manufacturing the piece continues by fitting of the fibrous preform 7 of an aerodynamic profile on the mounting portion 5 as illustrated in FIG. 2 then by co-densification of the preforms 1 and 7 thus assembled. The co-densification technique is a method known per se in which there is formation of a common matrix in the porosity of the preform 1 and of the preform 7 in order to secure it and obtain the blade or the propeller made of composite material. The co-densification can be carried out by introduction of a resin into the porosity of the preforms 1 and 7 and thermal treatment in order to crosslink this resin. The resin can be introduced by an injection or infusion technique. The resin may be an epoxy, polyamide or polyester resin, without limitation. The manufactured blade or propeller can be made of organic-matrix composite material. The invention can also apply to the formation of pieces made of ceramic-matrix composite material, for example by introduction of a ceramic precursor then pyrolysis of the latter in order to form the ceramic matrix. After formation of the matrix, the blade or the propeller can be mounted in the turbomachine, possibly after a step of removing or eliminating the substrate 20 for example by thermal treatment or dissolution if this is desired.

The invention claimed is:

1. A method for manufacturing a fibrous preform for a blade or propeller part of a turbomachine, the fibrous preform comprising at least one fixing base extended by a mounting portion of an aerodynamic profile, the method comprising:
    winding a fibrous texture, obtained by contour weaving, on a substrate of changing section having at least a first region of extra thickness in a shape of the fixing base and a second region in a shape of the mounting portion of the aerodynamic profile, wherein the substrate has the shape of the preform to be obtained and wherein the fibrous texture matches the shape of the substrate during the winding without being deformed.

2. The method according to claim 1, wherein the fibrous texture is co-wound on the substrate with a multiaxial web having fibers oriented differently from fibers of the fibrous texture.

3. The method according to claim 2, wherein the multiaxial web comprises at least a first unidirectional fibrous layer oriented at +45° relative to a longitudinal axis of the substrate, superimposed on at least a second unidirectional fibrous layer oriented at −45° relative to the longitudinal axis of the substrate.

4. The method according to claim 1, wherein the fixing base of the fibrous preform is axisymmetric.

5. The method according to claim 1, wherein the fibrous texture is obtained by contour weaving by using a take-up mandrel at an exit of a loom separate from the substrate and having at least a first yarn take-up area having a first radius and a second yarn take-up area with a second radius, the first radius being greater than the second radius, the yarns taken on the first area being wound on the first region of the substrate and those taken on the second area being wound on the second region of the substrate.

6. The method according to claim 1, wherein the contour weaving in the shape of the texture and its winding on the substrate are carried out continuously.

7. The method according to claim 1, wherein the substrate is obtained by three-dimensional weaving.

8. A method for manufacturing a composite material blade or propeller part for a turbomachine, comprising:
    manufacture of a fibrous preform for the blade or propeller part of a turbomachine by implementing a method according to claim 1, and
    formation of a matrix in a porosity of the fibrous preform thus obtained.

9. A method for manufacturing a composite material blade or propeller for a turbomachine, comprising:
    formation of a fibrous preform for the blade or propeller part of a turbomachine according to claim 1,
    positioning of a fibrous preform of an aerodynamic profile on the mounting portion, and co-densification of the fibrous preform of the turbomachine blade or propeller part and the fibrous preform of the aerodynamic profile positioned on this preform in order to obtain the turbomachine blade or propeller.

10. The method according to claim 9, wherein a fan blade is obtained.

11. The method according to claim 1, wherein the fibrous preform further comprises a pivoting element defining an end of the preform and located on a side opposite to the mounting portion.

* * * * *